United States Patent [19]

Makuch et al.

[11] 4,140,367
[45] Feb. 20, 1979

[54] MULTIPLE CHANNEL CONNECTOR FOR FIBER OPTIC CABLES

[75] Inventors: John A. Makuch, Danbury, Conn.; Melvin Gordon, Patterson, N.Y.

[73] Assignee: Bunker Ramo Corporation, Oak Brook, Ill.

[21] Appl. No.: 788,985

[22] Filed: Apr. 19, 1977

Related U.S. Application Data

[63] Continuation-in-part of Ser. No. 731,036, Oct. 8, 1976, abandoned.

[51] Int. Cl.² .............................................. G02B 5/16
[52] U.S. Cl. ......................... 350/96.22; 350/96.21
[58] Field of Search .............. 350/96 C, 96.21, 96.22

[56] References Cited

U.S. PATENT DOCUMENTS

| | | | |
|---|---|---|---|
| 3,947,182 | 3/1976 | McCartney | 350/96 C |
| 3,948,582 | 4/1976 | Martin | 350/96 C |
| 3,963,323 | 6/1976 | Arnold | 350/96 C |
| 3,969,015 | 7/1976 | LeNoane | 350/96 C |

*Primary Examiner*—John K. Corbin
*Assistant Examiner*—Stewart Levy
*Attorney, Agent, or Firm*—William Lohff; F. M. Arbuckle

[57] ABSTRACT

A connector assembly for coupling one or more pairs of fiber optic tubing cable segments comprises a mating plug and receptacle each including insert members having aligned passageways wherein the terminal ends of the fiber optic cable segments are disposed. An alignment sleeve within the passageways fixed to one insert member and slidably received by the other receives the terminal ends at respective ends of the fiber optic cable segments of the sleeve to maintain the terminal ends in axial, transverse and angular alignment.

14 Claims, 12 Drawing Figures

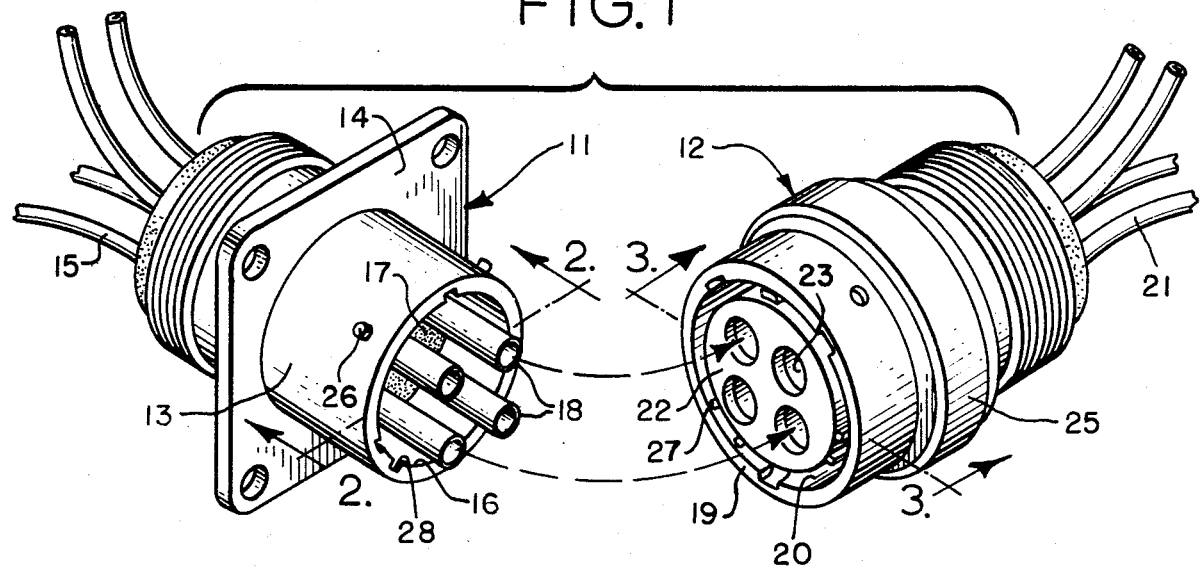
FIG.1
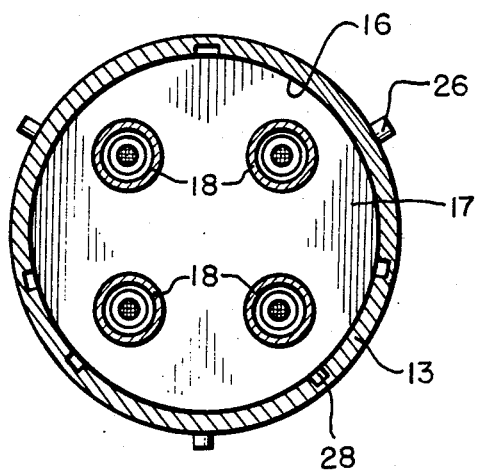
FIG.2
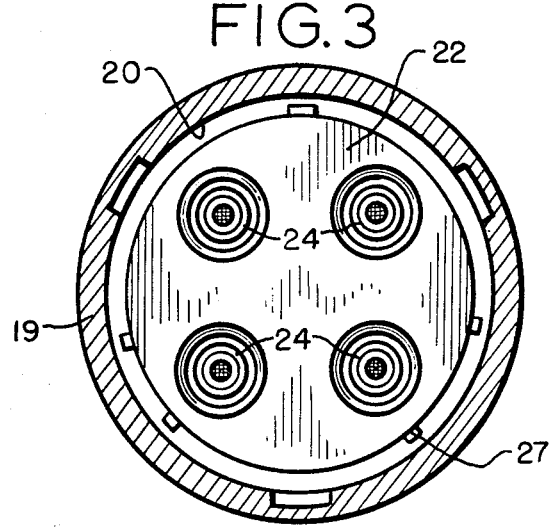
FIG.3
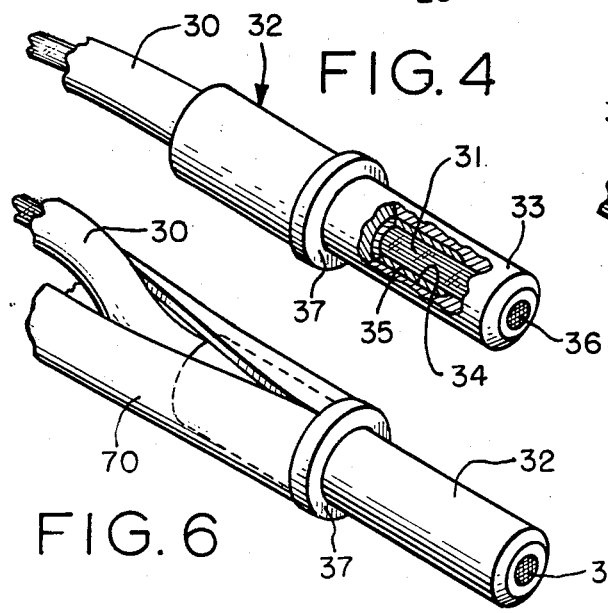
FIG.4
FIG.6
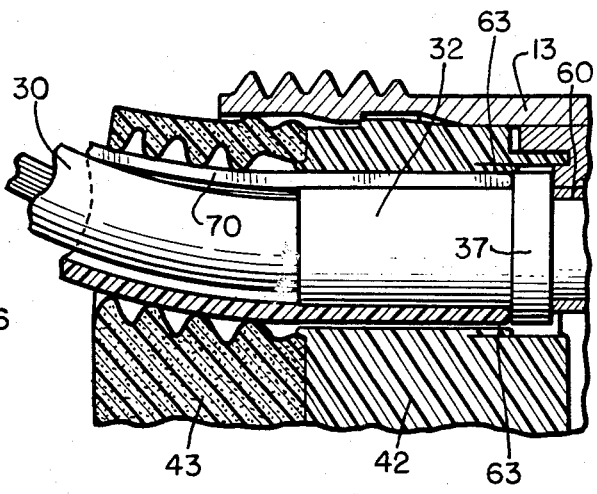
FIG.7

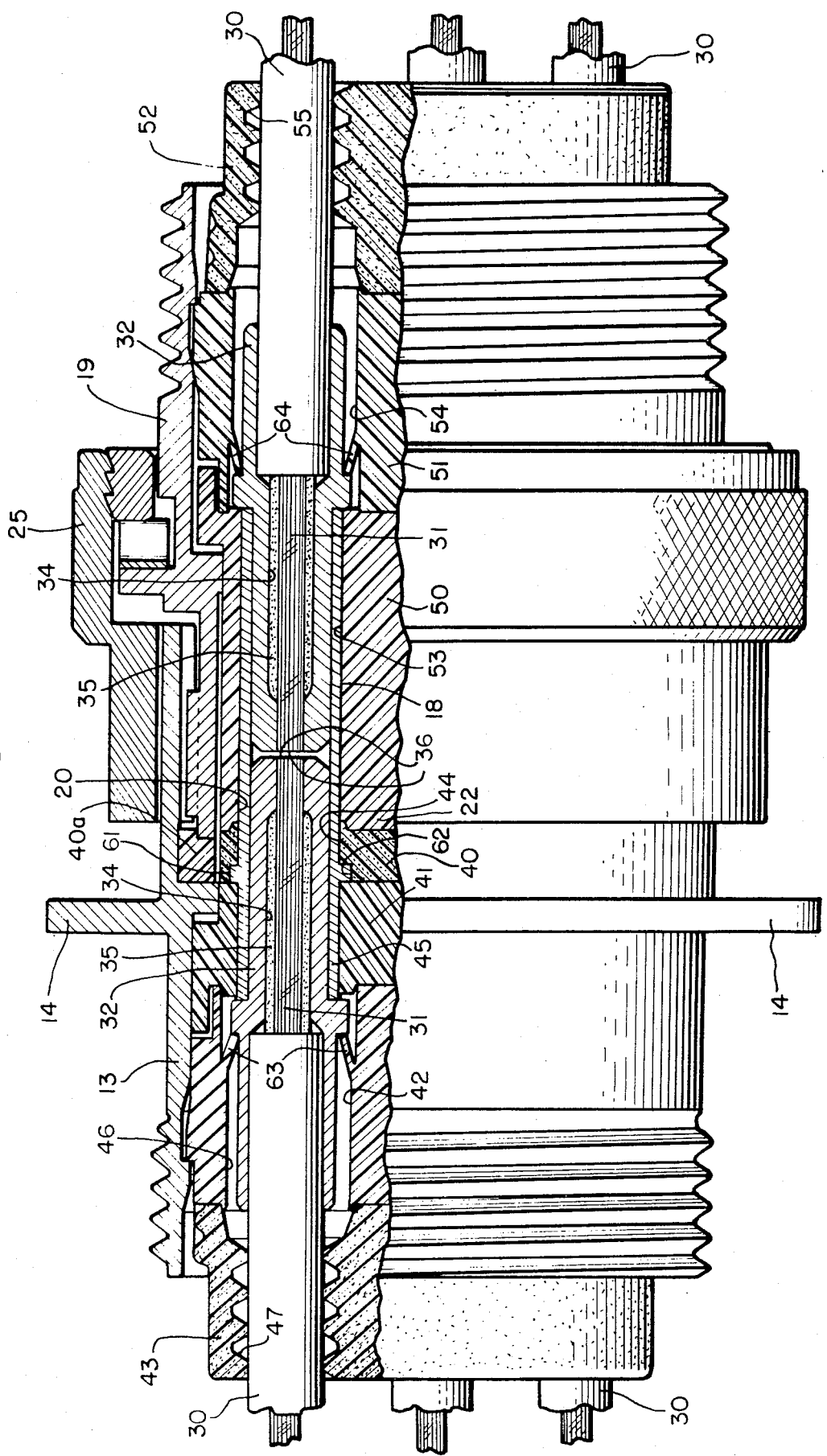

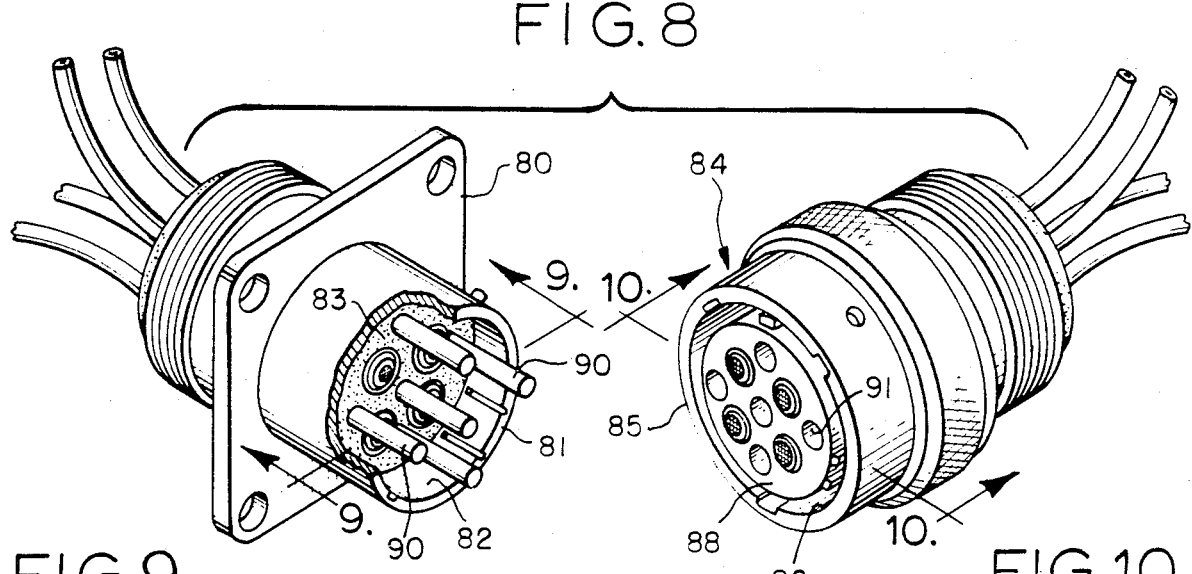
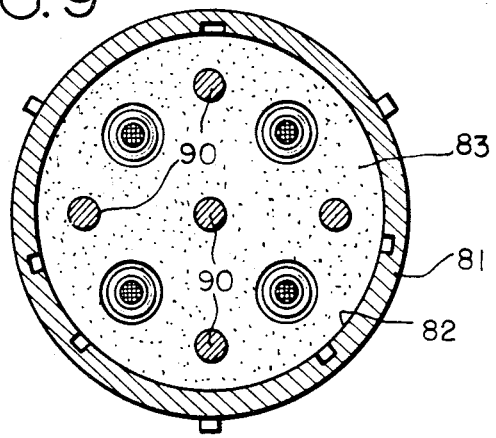
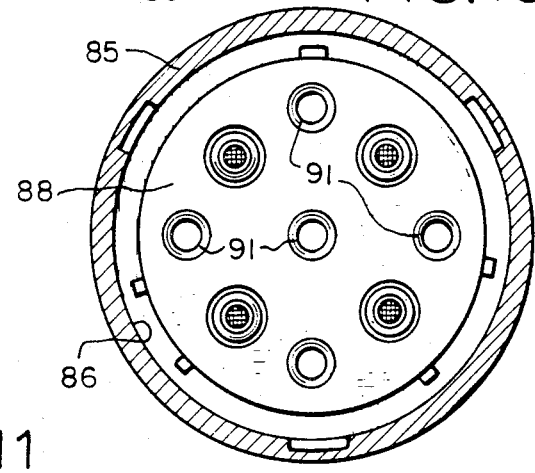
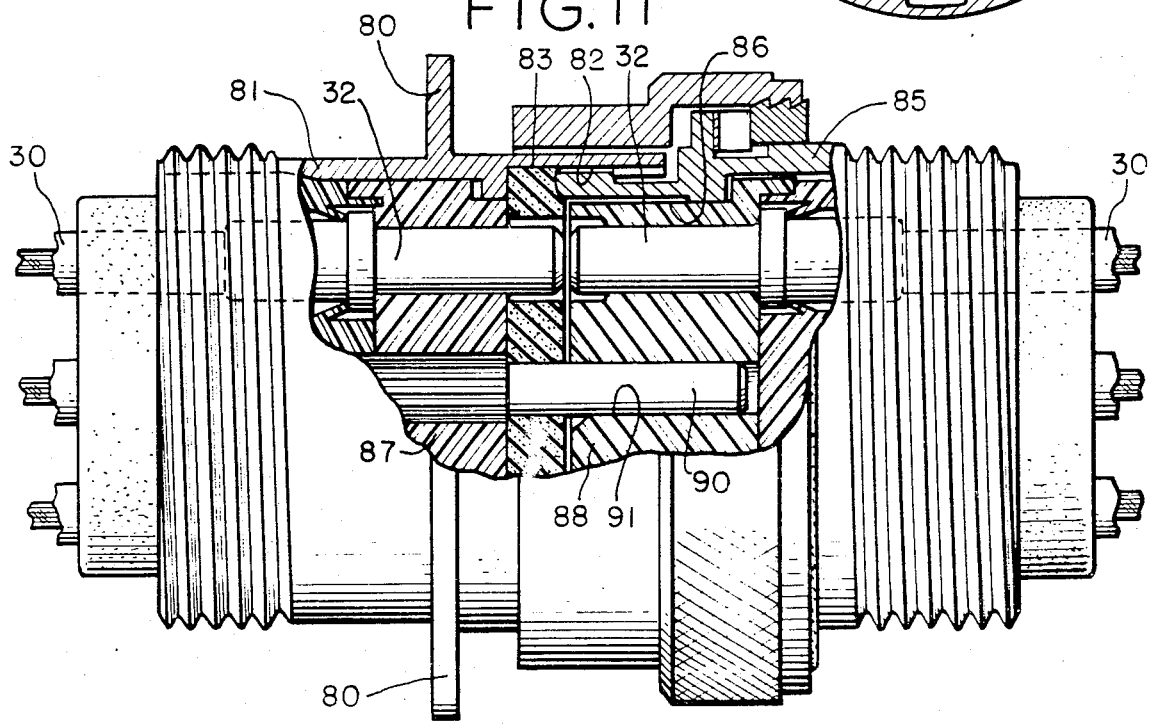

MULTIPLE CHANNEL CONNECTOR FOR FIBER OPTIC CABLES

RELATED APPLICATION

This is a continuation-in-part of application Ser. No. 731,036, filed Oct. 8, 1976 now abandoned, of John A. Makuch and Melvin Gordon for CONNECTOR FOR FIBER OPTIC TUBING.

BACKGROUND OF THE INVENTION

The invention is directed generally to connectors, and more particularly to a connector for fiber optic cable segments which provides improved and more consistent coupling of light between the segments.

In recent years fiber optic light transmission systems, wherein a single optically-conductive fiber or a multiplicity of parallel optically-conductive fibers are arranged to form a flexible light-conductive cable bundle for conveying light from one location to another, have come into increasing use, not only for providing illumination, but also for conveying data from one location to another. In the latter application a light source is modulated with data to be transmitted at one end of the cable bundle, and the data is recovered at the other end of the cable bundle by a photo-sensitive detector. Since the data is conveyed by a medium not subject to radio frequency interference or detection, such light transmission systems are particularly well adapted for high security applications, such as found in the data processing and military communications fields.

With the increasing use of fiber optic systems, the need has developed for a connector for connecting segments of light-conductive cable bundles with minimum detriment to the optical transmission path. Prior art connectors for this purpose have not been completely satisfactory, particularly where frequent connects and disconnects must be made under adverse environmental conditions, or where multiple fiber optic circuits must be connected in a single connector because of the difficulty of maintaining an accurate consistent alignment between the ends of coupled cable segments under such conditions. The present invention is directed to a connector which provides more accurate and consistent alignment of the terminal ends of fiber optic cable bundle segments under these conditions.

Accordingly, it is a general object of the present invention to prodvide a new and improved connector for light-conductive cable bundle segments.

It is another object of the present invention to provide a connector for light-conductive cable bundle segments which achieves improved and more consistent alignment between the ends of such segments.

It is another object of the present invention to provide a new and improved connector for connecting multiple pairs of light-conductive cable bundle segments with improved efficiency and consistency.

It is another object of the present invention to provide a connector for light-conductive cable bundle segments which achieves positive registration of corresponding segments to be connected.

SUMMARY OF THE INVENTION

The invention is directed to a connector assembly for joining the terminal ends of first and second segments of light-conductive cable bundles. The connector assembly comprises a receptacle including a shell having a forward mating end, and a first recess extending rearwardly from the mating end. First terminal support means including a first insert member is disposed within the first recess for positioning the terminal end of one of the cable bundle segments in a forwardly facing position. A plug including a shell having a forward mating end, and a second recess extending rearwardly from the mating end, is provided together with second terminal support means including a second insert member disposed within the second recess for positioning the terminal end of the other of the cable bundle segments in a forwardly facing position axially adjacent the terminal end of the first cable bundle segment. The terminal ends of the cable segments are maintained in axial, transverse and angular alignment to a high degree by alignment means extending between the first and second insert members.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIG. 1 is a perspective view of a connector constructed in accordance with the invention in an unmated condition;

FIG. 2 is a cross-sectional view of the receptacle portion of the connector taken along line 2—2 of FIG. 1;

FIG. 3 is a cross-sectional view of the plug portion of the connector taken along line 3—3 of FIG. 1;

FIG. 4 is a perspective view, partially broken away, of a fiber optic termination pin utilized in the connector for terminating the ends of light-conductive cable bundle segments;

FIG. 5b is an enlarged side elevational view, partially in cross-section, of the connector in a mated condition;

FIG. 6 is a perspective view of the termination pin of FIG. 4 shown in conjunction with a pin removal tool;

FIG. 7 is an enlarged cross-sectional view of a portion of the connector illustrating the use of the pin removal tool for removing a termination pin from the connector;

FIG. 8 is a perspecitve view of an alternate embodiment of the connector of the invention;

FIG. 9 is a cross-sectional view of the receptacle portion of the connector taken along line 9—9 of FIG. 8;

FIG. 10 is a cross-sectional view of the plug portion of the connector taken along line 10—10 of FIG. 8; and FIG. 11 is a side elevational view, partially broken away, of the connector of FIG. 8 in a mated state.

DESCRIPTION OF THE PREFERRED EMBODIMENT

Figure 5A:
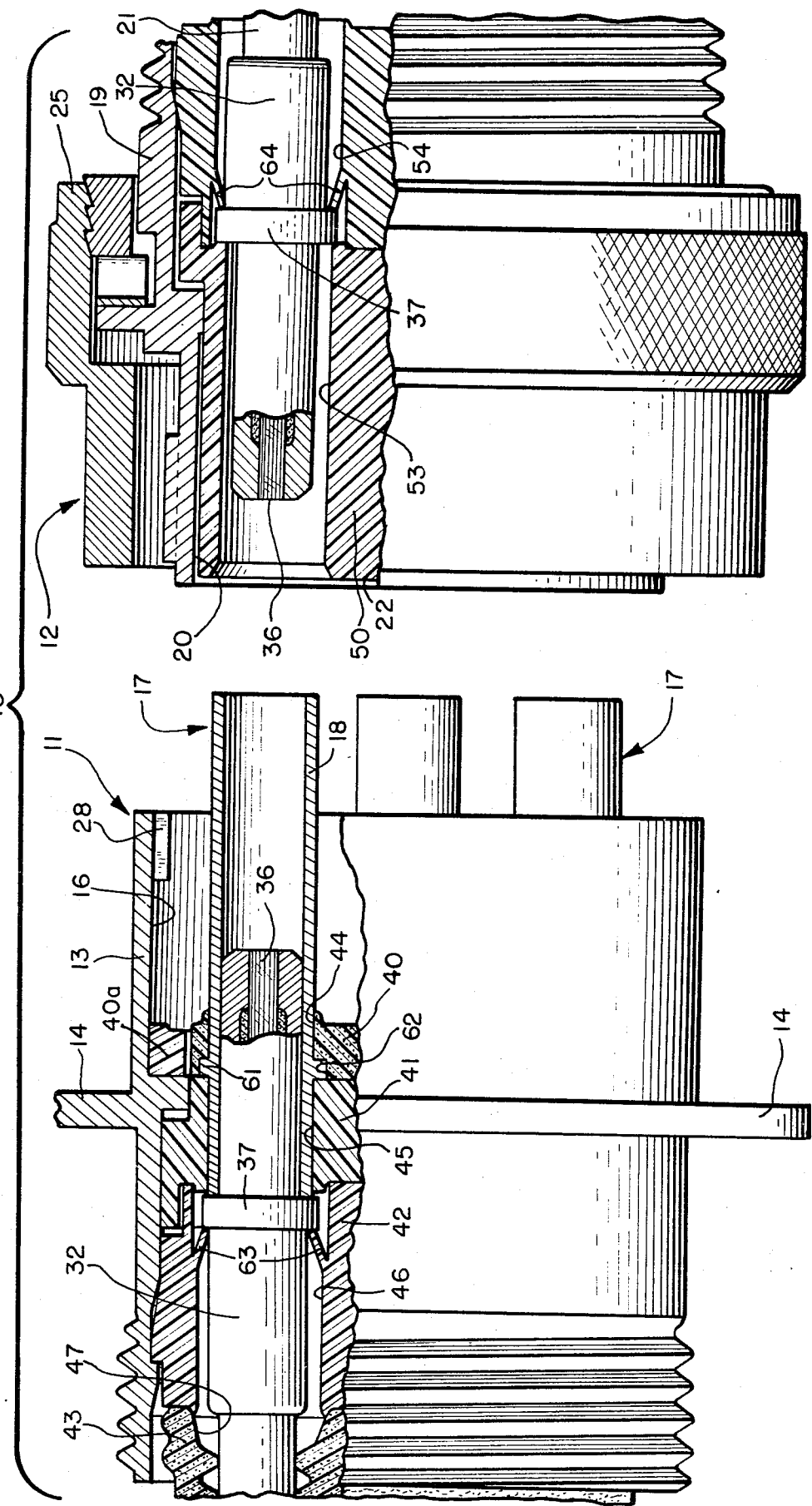
FIG. 5a is an enlarged side elevational view, partially in cross-section, of the connector in an unmated condition.

Referring to the figures, and particularly to FIGS. 1-3, a connector 10 constructed in accordance with the invention includes a flange-mounted receptacle 1, and a cable-mounted plug 12. Receptacle 11 could also of course be bulkhead-mounted or cable-mounted as well without departing from the invention. The receptacle includes a generally sleeve-shaped metal shell 13 having a front or mating end for receiving plug 12, and a flange 14 rearwardly of the mating end for mounting the receptacle to a wall or bulkhead (not shown). Individual segments of light-conductive cable 15 for which interconnections are to be established by the connector enter the receptacle from the rear. A plug-receiving recesss 16 extends rearwardly from the forward end of the receptacle. An insert assembly 17 positioned within shell 13 supports the projecting ends of four female fiber optic alignment sleeves 18 forming connecting assemblies associated with respective ones of light-conductive cable segments 15.

Plug 12 includes a generally sleeve-shaped elongated cylindrical shell having a front or mating end, and a recess 20 extending rearwardly from the front end of the plug for receiving in telescoping relationship the forward end of the receptacle shell 13. Fiber optic cable segments 21 to which interconnections are to be provided extend into the rear of the connector. A generally cylindrical insert assembly 22 dimensioned for telescoping insertion into recess 16 is disposed within recess 20, and includes four axially-extending apertures 23 in which four male fiber optic connecting assemblies 24 (FIG. 3) are positioned. A locking ring 25 of conventional construction is concentrically disposed over shell 19 to provide twist-lock engagement with protuberances 26 on shell 13 when the plug and receptacle are mated, in a manner well known to the art. A plurality of locating keys 27 on the side wall of insert assembly 22 coact with keyways 28 provided on the inside wall of recess 16 to assure correct orientation between the two insert assemblies.

Referring to FIGS. 4, 5a and 5b, fiber optic cables 15 and 21 may be entirely conventional in design and construction, having an outer jacket 30 and an inner light-conducting core of a single fiber or plural fibers generally designated 31. The fiber core can be constructed either of glass or a suitable plastic material, such as that marketed under the trade name Crofon by the DuPont Company. In the latter instance each fiber in the core 31 may consist of a central strand of polymethyl methacrylate sheathed with a transparent polymer of lower refractive index. The outer jacket 30 can be formed from a polyethylene resin such as that marketed under the trade name Alathon by the DuPont Company.

Referring to FIG. 4, the ends of each of the light-conductive cable segments 15 and 21 are individually terminated by means of terminating pins 32. Each of these pins comprises a hollow generally cylindrical metal housing 33 having an axially extending bore 34 within which the fiber core 31 of the cable is disposed. A layer of adhesive such as epoxy 35 between the fiber core and the wall of the aperture holds the core firmly in place.

The end of the fiber core extends along the bore 34 of the terminating pin and is cut substantially flush with the open end of the termination to provide a flat optical coupling surface 36.

The housing 33 of terminating pin 32 includes a front portion of reduced diameter, and a rear portion of increased diameter, and an annular flange 37 between these two portions. Bore 34 has a corresponding front portion of reduced diameter and a corresponding rear portion of increased diamter joined by a transition of convenient angle or taper, the jacket 30 of the fiber optic cable abutting the tapered shoulder formed between these two portions.

Referring to FIGS. 5a and 5b, the insert assembly 17 within receptacle shell 13 is seen to consist of a disc-shaped face sealing member 40, a peripheral seal 40a, a cylindrical pin insert member 41, pin retention disc 42, and a rear grommet 43, which are preferably constructed of high temperature elastomeric materials such as, for example, plastic and rubber. The face sealing member 40 includes four apertures 44 which are aligned with four apertures 45 in insert member 41, and with four apertures 46 in retention disc 42, and with four ribbed apertures 47 in grommet 43, to provide four continuous axially-extending bore-like passageways for receiving the terminal pins associated with respective ones of the four light-conducting cable segments 15.

The insert assembly 22 within the shell 19 of plug 12 is seen to include a cylindrical insert member 50, a retention disc 51, and a grommet 52 (FIG. 5b). The insert member 50 includes an aperture 53 which is aligned with an aperture 54 in retention disc 51, and with an aperture 55 in grommet 52 to form a continuous axially-extending passageway for receiving the terminal pins associated with respective ones of the four light-conducting cable segments 21.

In accordance with the invention, accurate alignment between the terminal pins associated with respective fiber optic cables 15 and the terminal pins associated with corresponding ones of fiber optic cables 21 is maintained by means of sleeves 18 positioned within the passageways formed in insert assembly 17. The alignment sleeves, which may be formed from metal or similar rigid material, are snugly received within these apertures.

The sleeves are resiliently held in place during insertion or removal of plug 12 by means of annular flanges 61 on the outside surfaces of the sleeves. Referring specifically to FIG. 5a, the sleeve is allowed some resilient axial movement upon mating by virtue of the flange 61 being captured in recess 62 formed in the elastomeric material of face seal member 40. Thus, when terminal cable ends are brought together, tines 63 push against the rear of ring 37, the front of ring 37 bears tightly against the end of the sleeve, and the sleeve axially moves within recess 45 achieving equilibrium between similar forces associated with the other half of the mated connector pair.

The slight axial movement permits optimal alignment of both terminating ends on a per channel basis always maintaining the proper axial separation between faces 36. This movement also allows tines 63 to be freely separated from ring 37 in the unmated condition, permitting unhindered removal of the terminating pin 32 with the tool 70 of FIG. 6.

The terminal pin 32 installed on the end of each of the four fiber optic cables 15 is inserted into its respective sleeve 18 from the rear, the annular flange 37 thereon abutting the rear edge of the sleeve. The inside dimensions of sleeve 18 are such that the terminating pin assembly 32 is snugly received therein and maintained in accurate alignment with respect thereto. A pair of tines 63 projecting inwardly from the wall of aperture 46 bear against the rearwardly-facing surface of the annular flange 37 to lock the terminating pin 32 in position and foreclose axial movement thereof.

In plug 12 the terminating pin 32 of each fiber optic cable 21 is received in respective apertures 53 and 54 and locked in place by means of tines 64 which project inwardly from the walls of recess 54 against the rearwardly facing surface of the terminating pin annular flange 37. The front of the annular flange 37 bears against a shoulder formed on the rear surface of insert member 50, thereby preventing the termination pin assembly 32 from being pulled out during mating or unmating of the connector. Since no alignment sleeve is present in plug 12 the terminal pin assemblies 32 associated with fiber optic cables 21 are not rigidly held in place, but rather are free to move axially and laterally to a limited extent.

When receptacle 11 and plug 12 are mated, as shown in FIG. 5b, insert assembly 22 telescopes into recess 16 as the shell 19 of plug 12 telescopes into the end of receptacle shell 13. This causes the four alignment sleeves 18 associated with receptacle 11 to extend into respective ones of the apertures 53 of insert assembly 22, in which the termination pin assemblies 32 associated with fiber optic cables 21 are disposed. As a result, the reduced diameter portions of the terminal pins associated with cables 21 are received in respective ones of sleeves 18. The resilient mounting of the termination pins in shell 19 facilitates this by enabling the pins to readily align themselves with the approaching sleeves. As the plug and receptacle become fully mated, the end faces 36 of the two terminal pin assemblies come into close, parallel, but non-abutting relationship, for high efficiency light transfer. Since the alignment sleeves 8 determine the positions of the termination pins, misalignment of the coacting light transfer surfaces 36 is precluded.

In addition, when the connector is fully assembled as shown in FIG. 5b, the grommets 43 and 52, the face seal 40, and the peripheral seal 40a are placed in a state of compression. As a result, the connector is completely sealed from impurities or contaminants that might be encountered in the environments where the connector is to be used.

In accordance with another aspect of the invention, the fiber optic terminal pin assemblies 32 associated with each fiber optic cable are removable from their respective passageways by inserting a small sleeve-shaped tool 70 into the passageways from the rear. This tool, as shown in FIG. 6, serves in the case of receptacle 11 to compress tines 63 against the sidewalls of aperture 46, or, in the case of plug 12 to compress tines 64 against the sidewall of aperture 54, with the result that the pin assemblies are released and can be removed rearwardly from the connector members. This is a significant advantage since it enables individual terminal pin assemblies to be removed, as when correcting installation errors or replacing damaged connectors or components thereof.

An alternate arrangement for maintaining alignment between terminal pins in a shell-type connector is shown in FIGS. 8-11. In this embodiment a receptacle 80 is provided having an elongated shell 81 defining a recess 82 within which an insert assembly 83 is disposed having four flush-mounted fiber optic termination pin assemblies 32. The receptacle 80 is adapted to mate with a plug 84 having an elongated shell 85 defining a recess 86 within which four additional termination pin assemblies 32 are flush mounted. The shell 85 of plug 84 is dimensioned to extend in telescoping relationship over the plug-receiving portion of shell 81. Insert assemblies 87 and 88 similar to those provided in receptacle 11 and plug 12 are provided within receptacle 80 and plug 84 for holding the fiber optic termination pin assemblies in position.

Since the terminating pin assemblies 32 are positioned with their coupling surfaces 36 parallel to the exposed surfaces of the insert assemblies, the coupling surfaces of corresponding terminal pins are brought into close abutting relationship when the connector is mated, as shown in FIG. 11. To maintain the accurate alignment required between coupling surfaces 36 for good efficiency, the insert assembly 87 of the receptacle 80 includes five axially-extending alignment pins 90 which extend into respective ones of five alignment sockets 91 provided in the surface of the insert assembly 88 of plug 84. By dimensioning these elements for a snug but non-binding engagement, the surfaces of the two insert assemblies are maintained in accurate alignment at all times during their engagement, irrespective of movement of either insert with respect to its shell.

It will be appreciated that while the invention has been shown in conjunction with connectors having round shells and four interconnections, it is also possible to practice the invention in connection with a greater or lesser number of interconnections, and with shells having other shapes and sizes, including rectangular and square cross-sections.

While particular embodiments of the invention have been shown and described, it will be obvious to those skilled in the art that changes and modifications may be made without departing from the invention in its broader apsects, and, therefore, the aim in the appended claims is to cover all such changes and modifications as fall within the true spirit and scope of the invention.

We claim:

1. A connector assembly for joining the terminal ends of at least one pair of segments of light conductive cable, comprising, in combination:
    a receptacle including a shell having a forward mating end, and a first recess extending rearwardly from said mating end;
    first terminal support means including a first insert member disposed within said first recess for positioning the terminal end of said cable segments in a forwardly facing position;
    a plug including a shell having a forward mating end, and a second recess extending rearwardly from said mating end;
    second terminal support means including a second insert member disposed within said second recess for positioning the terminal end of the other of said cable segments in a forwardly facing position axially adjacent the terminal end of said first cable segment; and
    alignment means extending from one of said insert members into the other of said insert members when said plug and said receptacle are mated for maintaining said terminal ends of said cable segments in axial, transverse and angular alignment with said terminal ends of said cable segments in close, non-abutting relationship.

2. A connector assembly as defined in claim 1 wherein said alignment means includes a sleeve in which said terminal ends of said cable segments are slidably received.

3. A connector assembly as defined in claim 2 wherein said first and second terminal support means each include a generally sleeve-shaped terminal pin assembly disposed over the terminal end of the corresponding one of said cable segments, and said pin assemblies are slidably received at opposite ends of said alignment sleeve.

4. A connector assembly as defined in claim 3 wherein one of said terminal pins and the corresponding end of said alignment sleeve are resiliently disposed within said first insert member, and the other of said terminal pins is resiliently disposed within said second insert member.

5. A connector assembly as defined in claim 2 wherein said first and second terminal support means each include an aperture, said apertures being axially aligned and one end of said alignment sleeve extending into one of said apertures and being resiliently mounted to the associated terminal support means thereof, and the other of said alignment sleeves extending into the other of said apertures and being slidably received therein when said plug and said receptacle are mated.

6. A connector assembly as defined in claim 1 wherein at least one of said terminal support means includes a generally sleeve-shaped terminal pin assembly disposed over the terminal end of the respective one of said cable segments and, said terminal support means includes an axially extending recess for slidably receiving said terminal assembly pin.

7. A connector assembly as defined in claim 6 wherein said one terminal support means includes retaining means for locking said terminal pin assembly within said axially-extending recess.

8. A connector assembly as defined in claim 7 wherein said retaining means comprises resilient fingers disposed in the side wall of said axially-extending aperture, said fingers being displaceable from the rear of said aperture to release said terminal pin assembly.

9. A connector assembly for joining the terminal ends of multiple pairs of segments of light conductive cable, comprising, in combination:
a receptacle including an elongated shell having a front mating end, and a first axially-aligned recess extending substantially the length thereof;
first terminal support means including a first insert member disposed within said recess, said insert member including axially-extending passageways for receiving the terminal ends of first ones of each of said cable segment pairs in forward-facing alignment;
a plug including an elongated shell having a front end, and a second axially-aligned recess extending substantially the length thereof, said shell being dimensioned for telescoping engagement with said shell of said receptacle;
second terminal support means including a second insert member disposed in said second recess, said insert member including second axially-extending passageways aligned with said first passageways for receiving the terminal ends of second ones of said cable segment pairs in forward-facing alignment; and
a plurality of alignment members each of which extends from one of said insert members into the other of said insert members, said alignment members being sized and shaped so as to be cooperatively related to said other of said insert members when said plug and receptacle are mated, said alignment members maintaining said terminal ends of said cable segments in axial, transverse and angular alignment with said terminal ends of said cable segments in close, non-abutting relationship.

10. A connector assembly as defined in claim 9 wherein said first and second terminal support means each include generally sleeve-shaped terminal assemblies disposed over the terminal ends of the corresponding ones of said cable segments, and said alignment members each include an alignment sleeve with corresponding pairs of said pin assemblies being slidably received at opposite ends of one of said alignment sleeves.

11. A connector assembly as defined in claim 1 wherein said alignment means includes at least one axially-extending alignment pin extending from one of said insert members, and a complementarily dimensioned and aligned pin-receiving socket in the other of said insert members.

12. A connector assembly as defined in claim 11 wherein said terminal ends on said cable segments are substantially flush with the forwardly-facing surfaces of respective ones of said insert members.

13. A connector assembly as defined in claim 1 further comprising key means for orienting said receptacle and said plug in a predetermined relation.

14. A connector assembly as defined in claim 13 wherein said key means comprises a plurality of keyways within said first recess and a corresponding plurality of locating keys on said second insert member.

* * * * *